United States Patent
Preston et al.

(10) Patent No.: US 9,518,331 B2
(45) Date of Patent: Dec. 13, 2016

(54) HYDROGEN SYSTEM AND METHOD OF OPERATION

(71) Applicant: Sustainable Innovations, LLC, East Hartford, CT (US)

(72) Inventors: Joshua S. Preston, Manchester, CT (US); Trent M. Molter, Glastonbury, CT (US); Mark E. Dristy, Oswego, NY (US); Vyas Krishnamurthy, Chestnut Ridge, NY (US); Gregory Hesler, Woodstock, CT (US)

(73) Assignee: SUSTAINABLE INNOVATIONS, LLC, East Hartford, CT (US)

( * ) Notice: Subject to any disclaimer, the term of this patent is extended or adjusted under 35 U.S.C. 154(b) by 202 days.

(21) Appl. No.: 14/321,123

(22) Filed: Jul. 1, 2014

(65) Prior Publication Data

US 2015/0001092 A1 Jan. 1, 2015

Related U.S. Application Data

(60) Provisional application No. 61/841,695, filed on Jul. 1, 2013.

(51) Int. Cl.
| | |
|---|---|
| C25B 15/02 | (2006.01) |
| C25B 1/10 | (2006.01) |
| B01D 53/32 | (2006.01) |
| C25B 1/04 | (2006.01) |

(52) U.S. Cl.
CPC ............. *C25B 15/02* (2013.01); *B01D 53/326* (2013.01); *C25B 1/04* (2013.01); *C25B 1/10* (2013.01); *Y02E 60/366* (2013.01)

(58) Field of Classification Search
CPC .............. C25B 15/02; C25B 1/04; C25B 1/10; B01D 53/326
See application file for complete search history.

(56) References Cited

U.S. PATENT DOCUMENTS

| | | |
|---|---|---|
| 6,190,623 B1 | 2/2001 | Sanger et al. |
| 6,280,864 B1 | 8/2001 | Towler et al. |
| | (Continued) | |

OTHER PUBLICATIONS

Written Opinion of the International Searching Authority/International Search Report for International Application No. PCT/US2014/045056; Date of Mailing, Nov. 25, 2014; 13 pgs.

*Primary Examiner* — Nicholas A Smith
(74) *Attorney, Agent, or Firm* — Cantor Colburn LLP

(57) ABSTRACT

A system is disclosed for providing hydrogen that includes a first PEM electrochemical cell or stack including a membrane electrode assembly that includes an inlet for a first gas that comprises hydrogen in fluid communication with the anode side of the first electrochemical cell or cell stack, and an outlet in fluid communication with the cathode side of the first electrochemical cell or stack. A second electrochemical cell or cell stack includes a water inlet in fluid communication with the anode side of the second electrochemical cell or cell stack, and an outlet in fluid communication with the cathode side of the second electrochemical cell or cell stack. A controller is configured to operate the first electrochemical cell or cell stack as a primary hydrogen source and to controllably operate the second electrochemical cell or cell stack as a secondary hydrogen source.

26 Claims, 2 Drawing Sheets

(56) References Cited

U.S. PATENT DOCUMENTS

| | | | |
|---|---|---|---|
| 2004/0040862 A1* | 3/2004 | Kosek | C01B 3/503 |
| | | | 205/637 |
| 2004/0131902 A1 | 7/2004 | Frank et al. | |
| 2013/0071763 A1* | 3/2013 | Betts | H01M 8/0637 |
| | | | 429/411 |
| 2013/0317959 A1* | 11/2013 | Joos | C25B 15/02 |
| | | | 705/34 |

* cited by examiner

HYDROGEN SYSTEM AND METHOD OF OPERATION

This application claims priority to U.S. provisional application 61/841,695 filed Jul. 1, 2013, the disclosure of which is incorporated herein by reference in its entirety.

BACKGROUND OF THE INVENTION

The subject matter disclosed herein relates to an electrochemical system for providing hydrogen.

Hydrogen is widely used in a variety of applications, including as a fuel for combustion, a chemical reactant, and in situations where a reducing environment is needed such as for various types of material surface treatments. Hydrogen is produced on an industrial scale by the reformation of natural gas, and the traditional approach for commercial users of hydrogen such as described above whose hydrogen needs do not justify large-scale industrial hydrogen production has been simply to maintain a hydrogen storage system on-site to provide fresh hydrogen for processes such as metal heat treatments. However, effective storage of pure hydrogen can be costly and complex, requiring high pressures and/or low temperatures. On-site hydrogen production through the use of PEM electrolysis cell stacks that separate water into hydrogen and oxygen gas provides an alternative to purchase and storage of hydrogen from commercial producers. However, the electricity costs associated with producing hydrogen through PEM electrolysis can be significant. Additionally, such on-site PEM electrolysis systems must either be sized to handle peak load demands (often necessitating that the system must be over-sized compared to typical demand loads) or a hydrogen storage system is needed to have extra hydrogen available for peak load situations, both of which can significantly drive up the cost and difficulty of providing hydrogen.

Accordingly, while existing hydrogen systems are suitable for their intended purposes, the need for improvement remains.

BRIEF DESCRIPTION OF THE INVENTION

According to one aspect of the invention, a system for providing hydrogen comprises a first electrochemical cell or cell stack comprising a first membrane electrode assembly comprising a cathode and an anode separated by a proton exchange membrane, an inlet for a first gas that comprises hydrogen in fluid communication with the anode side of the first electrochemical cell or cell stack, and an outlet in fluid communication with the cathode side of the first electrochemical cell or cell stack method of operating an electrochemical cell stack is provided. The system also includes a second electrochemical cell or cell stack comprising a second membrane electrode assembly comprising a cathode and an anode separated by a proton exchange membrane, a water inlet in fluid communication with the second membrane electrode assembly, and an outlet in fluid communication with the cathode side of the second membrane electrode assembly.

Additionally, the system includes a controller in communication with the first and second electrochemical cells or cell stacks (e.g., via an electronic signal) configured to receive a hydrogen demand signal. The controller is further configured such that when the hydrogen demand signal is greater than zero and the first gas is available at the first electrochemical cell or cell stack inlet, the controller is configured to operate the first electrochemical cell or cell stack as a primary hydrogen source and to controllably operate the second electrochemical cell or cell stack as a secondary hydrogen source in response to the hydrogen demand signal and/or the hydrogen output of the first electrochemical cell or cell stack. It should be noted here that the term "available" with respect to the first gas refers to a sufficient flow rate of first gas with sufficient quantities of hydrogen being available for operation of the first electrochemical cell or stack according to its design specifications. When the hydrogen demand signal is greater than zero and the first gas is not available (i.e., not available in sufficient quantities) at the first electrochemical cell or cell stack inlet, the controller operates the second electrochemical cell or cell stack. This control scheme prioritizing the use of the first electrochemical cell or stack is advantageous because the first electrochemical cell or stack can operate with lower power requirements and/or higher efficiency than the second electrochemical cell or stack.

In another aspect of the invention, a method of providing hydrogen comprises receiving a hydrogen demand signal and, when the hydrogen volume demand signal is greater than zero and a first gas comprising hydrogen is available, operating the first electrochemical cell or cell stack to provide hydrogen at an outlet in fluid communication with the cathode side of the first electrochemical cell or cell stack, and controllably operating the second electrochemical cell or cell stack in response to the hydrogen demand signal and/or the hydrogen output of the first electrochemical cell or cell stack. When the hydrogen demand signal is greater than zero and the first gas is not available at the first electrochemical cell or cell stack inlet, the second electrochemical cell or cell stack is operated to provide hydrogen.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
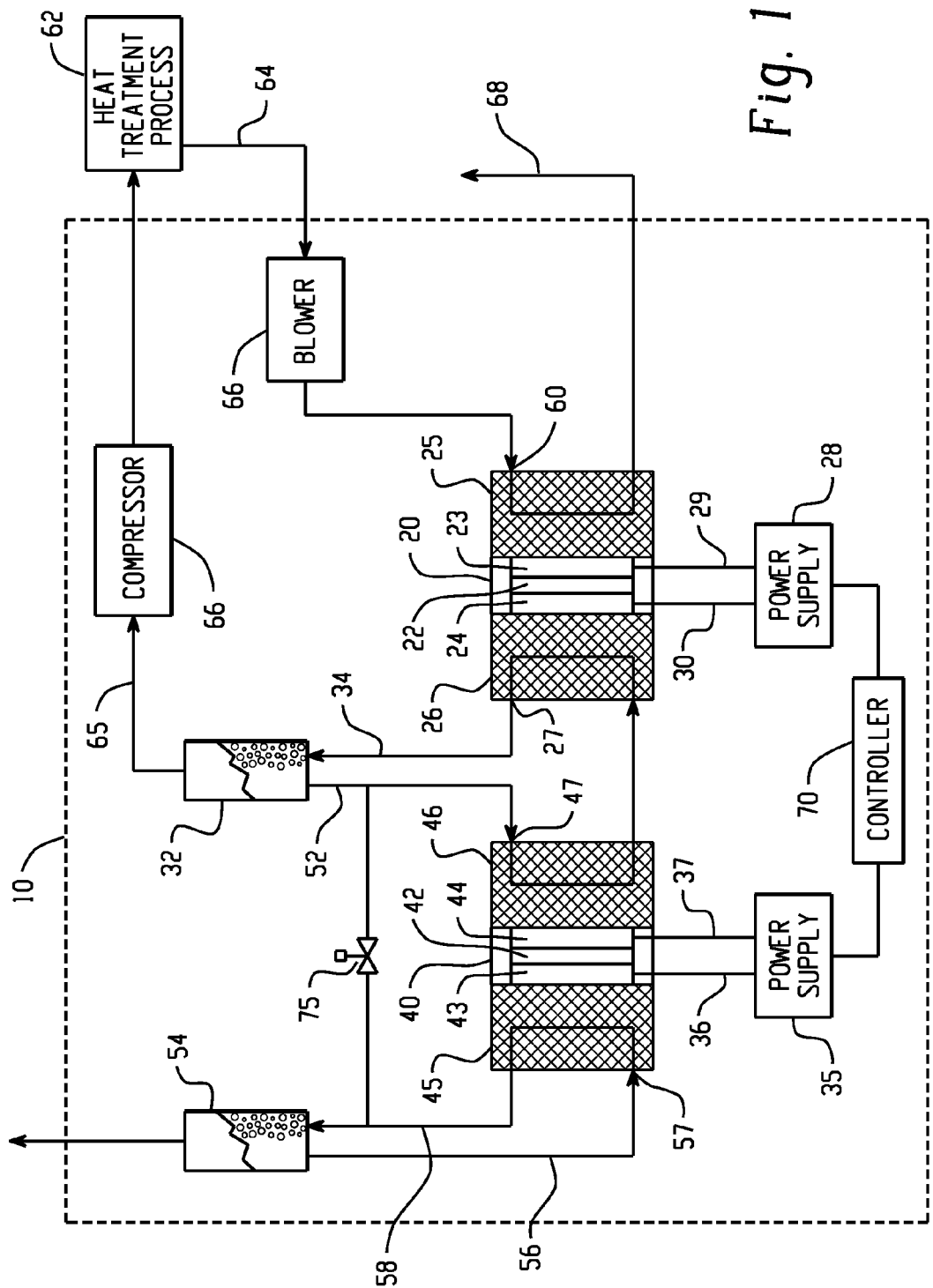
FIG. 1 is a schematic illustration of a system for providing hydrogen in accordance with an exemplary embodiment of the invention.

Referring now to FIG. 1, an exemplary system 10 for providing hydrogen is shown. A first electrochemical cell or cell stack comprises a membrane electrode assembly (MEA) having a proton exchange membrane 22 with an anode 23 and a cathode 24 disposed on either side thereof. An anode-side flow field structure 25 and a cathode-side flow field structure 26 are disposed on either side of the MEA. These structures are typically disposed distal from the MEA, with the MEA and flow field structures each mounted in a frame assembly (not shown), to provide space for fluid flow in contact with the MEA. However, for ease of illustration they are depicted in the FIG. 1 schematic as being in contiguous contact with the MEA. A power supply 28 is electrically connected to anode 23 and cathode 24 through electrical connections 29 and 30, respectively. A water source 32 provides water to the cathode-side flow field structure 26 through water circulation line 34 to hydrate the proton exchange membrane 22 and provides a liquid medium through which gaseous hydrogen produced by the first electrochemical cell flows.

In operation, the first electrochemical cell 20 receives a flow of a first gas comprising hydrogen at first gas inlet 60. The first gas can comprise at least one other gas component (e.g., nitrogen, carbon monoxide, carbon dioxide) such as in a spent process gas recycle stream or it can be pure or substantially pure (at process specifications) hydrogen (e.g., a recirculation stream from an unused process hydrogen stream). The first electrochemical cell 20 operates as a separator in which the applied current across the electrochemical cell drives hydrogen ions (protons) across the MEA from the anode side to the cathode side while other component(s) in the first gas remain on the anode side of the MEA. An exemplary source of hydrogen-containing first gas could be exhaust gas from a hydrogen atmosphere heat treatment process 62, which flows through conduit 64 to system blower 66, which delivers the first gas to first gas inlet 60, or as mentioned above, it can be a hydrogen recirculation line for unused process hydrogen. Hydrogen is ionized and passes through the MEA, leaving hydrogen-depleted gas to exit the anode side of first electrochemical cell 20 through conduit 68 where it can be vented or subjected to further processing. Protons that pass through the MEA are combined with electrons at the cathode 24 to provide hydrogen that passes through outlet 27, where it bubbles through water source 32 to compressor 66 for supply to heat treatment process 62.

A second electrochemical cell or cell stack comprises a membrane electrode assembly (MEA) having a proton exchange membrane 42 with an anode 43 and a cathode 44 disposed on either side thereof. An anode-side flow field structure 45 and a cathode-side flow field structure 46 are disposed on either side of the MEA. These structures are typically disposed distal from the MEA, with the MEA and flow field structures each mounted in a frame assembly (not shown), to provide space for fluid flow in contact with the MEA. However, for ease of illustration they are depicted in the FIG. 1 schematic as being in contiguous contact with the MEA. A power supply 35 is electrically connected to anode 43 and cathode 44 through electrical connections 36 and 37, respectively. The water source 32 provides water to the cathode-side flow field structure 46 through water circulation line 52 to hydrate the proton exchange membrane 42 and provides a liquid medium through which gaseous hydrogen produced by the second electrochemical cell bubbles on its way to delivery. A water source 54 provides water to the anode-side flow field structure 45 through water circulation line 56 to provide feed water for electrolysis, to hydrate the proton exchange membrane 42, and to provide a liquid medium through which gaseous oxygen produced by the second electrochemical is bubbled on its way to a collector or venting. It should be noted that the arrangement of the water sources 32, 54 represent an exemplary embodiment, and that other arrangements and flow paths can be used as well, such as a primary water feed to the cathode side of the second electrochemical cell or cell stack instead of to the anode side from water source 54.

During operation, the second electrochemical cell 40 operates as a PEM electrolyzer, receiving a flow of water at water inlet 57. The water is electrolyzed to form hydrogen and oxygen. The hydrogen is ionized and passes through the MEA, leaving the oxygen to exit through conduit 58 where it bubbles through water source 54. Protons that pass through the MEA are combined with electrons at the cathode 44 to provide hydrogen that passes through outlet 47, where it bubbles through water source 32 to compressor 66 for supply to heat treatment process 62.

Proton exchange membranes 22, 42 can comprise electrolytes that are solids under the operating conditions of the electrochemical cell. Useful materials from which the membranes 22, 42 can be fabricated include proton conducting ionomers and ion exchange resins. Ion-exchange resins useful as proton conducting materials include hydrocarbon- and fluorocarbon-type resins. Fluorocarbon-type resins typically exhibit excellent resistance to oxidation by halogen, strong acids, and bases. One family of fluorocarbon-type resins having sulfonic acid group functionality is NAFION® resins (commercially available from E. I. du Pont de Nemours and Company, Wilmington, Del.).

Anodes 23, 43 and cathodes 24, 44 can be fabricated from catalytic materials suitable for performing the needed electrochemical reaction (e.g., the dissociation of hydrogen gas). Suitable catalytic materials include, but are not limited to, platinum, palladium, rhodium, carbon, gold, tantalum, tungsten, ruthenium, iridium, osmium, alloys thereof, and the like, as well as combinations of the foregoing materials. Anodes 23, 43 and cathodes 24, 44 are positioned adjacent to, and preferably in contact with, their respective proton exchange membrane 22, 52 and can have defined by structures comprising discrete catalytic particles adsorbed onto a porous substrate. Adhesion of the catalytic particles onto a substrate may be by any method including, but not limited to, spraying, dipping, painting, imbibing, vapor depositing, combinations of the foregoing methods, and the like. Alternately, the catalytic particles may be deposited directly onto opposing sides of proton exchange membranes 22, 42 or onto support members.

For ease of illustration, the first and second electrochemical cells or cell stacks are each shown in FIG. 1 as a single cell. It is of course understood that a system as shown in FIG. 1 could have a first cell stack in place of the first electrochemical cell 20 and a second cell stack in place of the second electrochemical cell 40. Individual electrochemical cells can be arranged as modules in a stack, separated by interconnects that can provide flow field structures as well as electrical connection between the cells to provide electrical current flow in the stack. Typically, the cells in a PEM electrolyzer stack are connected in series electrically, with fluid flow distributed into or collected from the stack by header passages that are in fluid communication with the stack inlets and outlets. It should be appreciated that each of the electrochemical cells or stacks can include further components as is known in the art. These additional components can include, for example, gas diffusion layers, current collectors and the like.

The system also includes a controller 70 in communication (e.g., via an electronic signal) with the first and second electrochemical cells 20, 40, specifically in communication with the power supplies 28, 35, and with other process control components such as valve 75, which can be opened to transfer water from the water source 32 to water source 54 water to compensate for water that has been transferred from the water source 54 to the water source 32 by proton flux through the proton exchange membranes 22, 52. The controller is configured (e.g., through hardware and/or software programming) to receive a hydrogen demand signal as well as other inputs such as information (such as from a pressure sensor) that the first gas is available at the first electrochemical inlet 68 and/or the amount or pressure of hydrogen gas being generated by the first electrochemical cell. Criteria for generating the hydrogen demand signal will vary depending on the specific needs of hydrogen-consuming operations being conducted, such as the hydrogen atmosphere heat treatment process of FIG. 1. In some exemplary embodiments, the first electrochemical cell has a fixed or constant voltage applied across the anode and the cathode. If there is no hydrogen in the feed stream, no current will flow, so that the power consumption and operation of the first electrochemical cell is relatively self-regulating. The balance of the $H_2$ demand can be determined at least in part by measuring total cell-Amps of the first electrochemical cell to determine when it is operating at maximum capacity, is made up by the second cell. When the hydrogen demand signal is greater than zero and the first gas is not available in sufficient quantities at the first electrochemical cell or cell stack inlet, the controller will operate the second electrochemical cell or cell stack by causing the power supply 35 to apply an electrical potential across the anode 44 and the cathode 43, as well as causing other process equipment (e.g., pumps, valves, compressor 66, etc.) to provide water feed to water inlet 57 and to deliver hydrogen for process use, e.g., hydrogen atmosphere heat treatment process 62).

When the hydrogen demand signal is greater than zero and the first gas is available at the first electrochemical cell or cell stack inlet, the controller will operate the first electrochemical cell or cell stack 20 as a primary hydrogen source by causing the power supply 28 to apply an electrical potential across the anode 24 and the cathode 23, as well as causing other process equipment to provide first gas feed to inlet 60 and to deliver hydrogen for process use. In this operating mode, the controller will controllably operate the second electrochemical cell 40 as a secondary hydrogen source based on the hydrogen demand signal and/or the hydrogen output of the first electrochemical cell 20. In some embodiments, "operating the first electrochemical cell or cell stack as a primary hydrogen source" and "controllably operating the second electrochemical cell or cell stack as a secondary hydrogen source" means that the first electrochemical cell or stack is operated at a specified maximum current (the specified value of which may of course depend on operating conditions) while the second electrochemical cell or stack is operated at a variable output based on the hydrogen demand signal and/or the hydrogen output of the first electrochemical cell or stack. In some embodiments, the hydrogen output of the first electrochemical cell stack can be explicitly obtained, e.g., by measuring pressure in line 34. In other embodiments, hydrogen output of the first electrochemical cell can be indirectly determined based on other process conditions like elapsed time of operation and/or volume and hydrogen concentration of the first gas feed to the first electrochemical cell or stack.

Operation of the second electrochemical cell or stack as a secondary hydrogen source can be carried out in a variety of ways. For example, in some embodiments, the controller is configured to operate the first electrochemical cell or cell stack at a predetermined current when the first gas is available, and to selectively toggle the second electrochemical cell or cell stack between an off state and an on state in response to the hydrogen demand signal and/or the hydrogen output of the first electrochemical cell or cell stack. In some embodiments, the controller is configured to operate the first electrochemical cell or cell stack at a predetermined current when the first gas is available, and to operate the second electrochemical cell or cell stack at a variable current in response to the hydrogen demand signal and/or the hydrogen output of the first electrochemical cell or cell stack. In some embodiments, the current applied to the second electrochemical cell or stack can be both toggled and variable.

Figure 2:
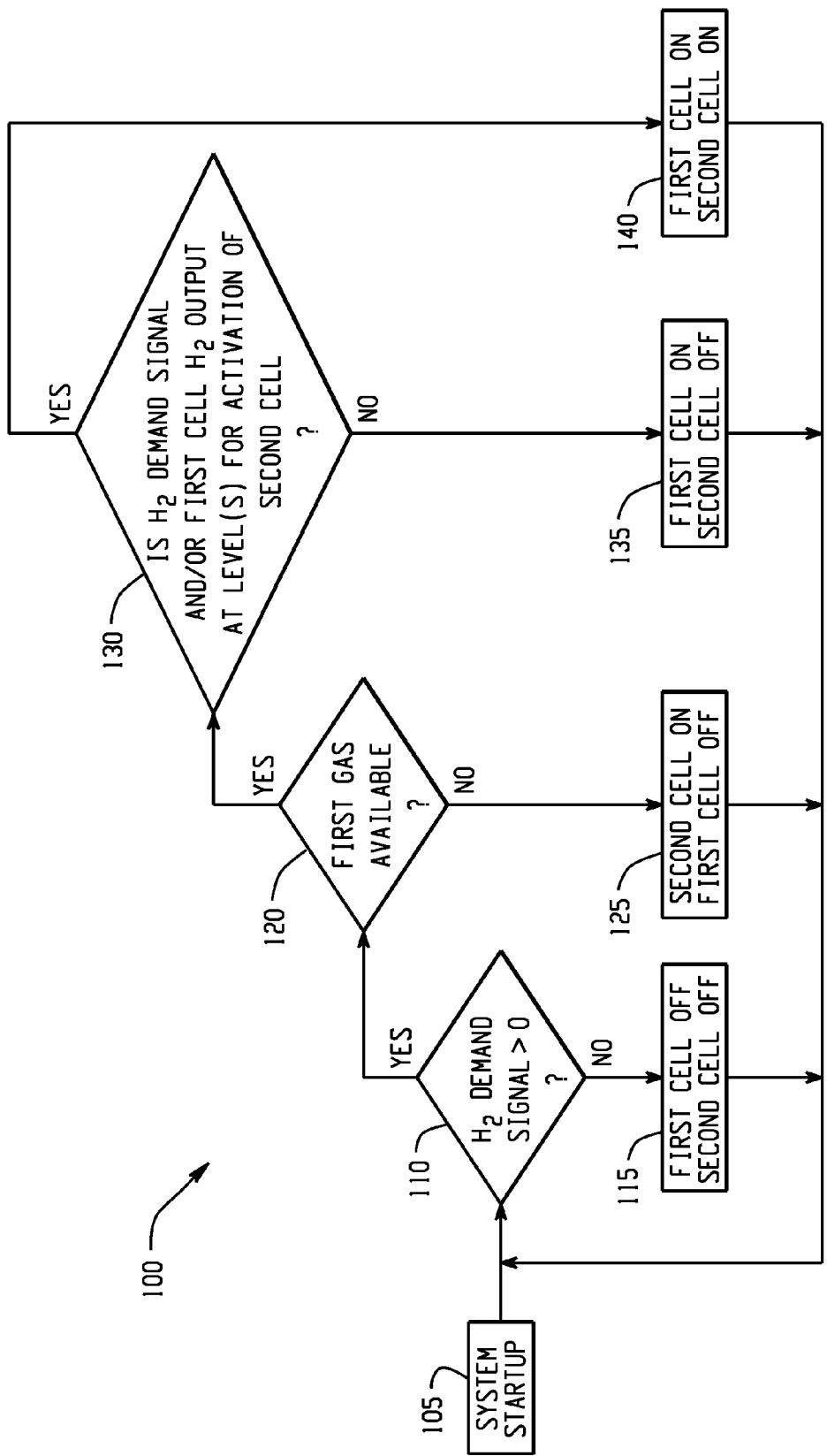
FIG. 2 is a schematic illustration of a flow diagram for operating a system for providing hydrogen in accordance with an embodiment of the invention.

A flow chart for a simplified process control scheme 100 where the second electrochemical cell or stack is toggled is depicted in FIG. 2. As shown in FIG. 2, after system startup 105, the process 100 proceeds to query block 110, where it is determined whether the hydrogen demand signal is greater than 0. If the query result is no, the process control proceeds to block 115 where the first cell/stack and the second cell/stack are set in the off (or standby) state and the process control loops back to the query block 110. If the result from query block 110 is yes, then the process control proceeds to query block 120 where it is determined whether a first gas comprising hydrogen is available to be fed to the first electrochemical cell/stack. If the result from query block 120 is no, the process control proceeds to block 125 where the first cell/stack is set to an off (or standby) state and the second cell/stack is set in an on state and the process control loops back to the query block 110. If the result from query block 120 is yes, then the process control proceeds to query block 130 where it is determined whether the hydrogen demand signal and/or the hydrogen output of the first electrochemical cell/stack are at level(s) for activation of the second a first gas comprising hydrogen is available to be fed to the first electrochemical cell/stack. The specific criteria (i.e., signal levels) used for making this determination will of course vary depending on the specifics of the process design and requirements, but are generally specified so that the second electrochemical cell/stack will be activated when the hydrogen output of the first electrochemical cell/stack is not sufficient to satisfy the hydrogen demand. If the result from query block 130 is no, the process control proceeds to block 135 where the first cell/stack is set to an on state and the second cell/stack is set in an on off (or standby) state. If the result from query block 130 is yes, then the process control proceeds to block 140 where both the first and second electrochemical cells/stacks are set to an on state.

Exemplary embodiments described herein can provide hydrogen at significantly lower cost than conventional storage of purchased hydrogen or on-site PEM electrolysis hydrogen systems. Additionally, the peak load sizing issues faced by on-site electrolysis hydrogen systems as discussed above are mitigated because higher levels of hydrogen demand from processes such as hydrogen atmosphere heat treatment processes will produce greater levels of hydrogen-containing first gas, with concomitant higher levels of hydrogen production from the first electrochemical cell/stack. Such higher levels of hydrogen production from the first electrochemical cell/stack can offset the need for storage of large amounts make-up hydrogen that is often required to supplement hydrogen production from a PEM electrolyzer in a conventional on-site PEM electrolysis hydrogen system so that a smaller hydrogen storage buffer can be used instead.

Of course, as mentioned above, the system depicted in FIG. 1 is exemplary, and systems according to the invention can include various other components. For example, multiple first stacks can be disposed in parallel and/or multiple second stacks can be disposed in parallel to provide additional capacity. Multiple first stacks can be disposed in series and/or multiple second stacks can be disposed in series to provide greater hydrogen pressure outputs and/or purity. Also, the actual physical electrochemical cells or stacks can, depending on operating parameters, be switched between performing the function of the first electrochemical cell or stack (i.e., hydrogen concentration) and performing the function of the second electrochemical cell or stack (i.e., electrolysis). For example, hydrogen can be fed intermittently to an electrochemical cell or stack that otherwise functions as an electrolysis cell or stack. In some embodiments, a PEM electrochemical compressor can be used instead of conventional compressor 66, or either or both of the first and second electrochemical cells/stacks 20, 40 can be configured to include PEM compressor functionality to provide a desired pressure so that optional compressor 66 is not needed. Also, as mentioned above, a hydrogen storage buffer downstream of conduit 65 can be included either in the system or as part of the hydrogen-consuming process outside of the system. Other modifications and/or additions within the skill of the art can be made as well.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:
1. A system for providing hydrogen, comprising:
a first electrochemical cell or cell stack comprising a first membrane electrode assembly comprising a cathode and an anode separated by a proton exchange membrane, an inlet in controllable fluid communication with a variably-available source of a first gas that comprises hydrogen in fluid communication with the anode side of the first electrochemical cell or cell stack, and an outlet in fluid communication with the cathode side of the first membrane electrode assembly;
a second electrochemical cell or cell stack comprising a second membrane electrode assembly comprising a cathode and an anode separated by a proton exchange membrane, a water inlet in fluid communication with the second membrane electrode assembly, and an outlet in fluid communication with the cathode side of the second membrane electrode assembly; and
a controller in communication with the first and second electrochemical cells or cell stacks, configured to receive a hydrogen demand signal and:
(i) when the hydrogen demand signal is greater than zero and the first gas is not available at the first electrochemical cell or cell stack inlet, to operate the second electrochemical cell or cell stack, and
(ii) when the hydrogen demand signal is greater than zero and the first gas is available at the first electrochemical cell or cell stack inlet, to operate the first electrochemical cell or cell stack as a primary hydrogen source and to controllably operate the second electrochemical cell or cell stack as a secondary hydrogen source in response to the hydrogen demand signal and/or the hydrogen output of the first electrochemical cell or cell stack.

2. The system of claim 1, wherein the controller is configured to operate the first electrochemical cell or cell stack at a predetermined current when the first gas is available, and to selectively toggle the second electrochemical cell or cell stack between an off state and an on state in response to the hydrogen demand signal and/or the hydrogen output of the first electrochemical cell or cell stack.

3. The system of claim 1, wherein the controller is configured to operate the first electrochemical cell or cell stack at a predetermined current when the first gas is available, and to operate the second electrochemical cell or cell stack at a variable current in response to the hydrogen demand signal and/or the hydrogen output of the first electrochemical cell or cell stack.

4. The system of claim 1, wherein the water inlet of the second electrochemical cell or cell stack is in fluid communication with the anode side of the second membrane electrode assembly, and further comprising a first volume of liquid water in fluid communication with the water inlet of the second electrochemical cell or cell stack and in fluid communication with the anode side of the first electrochemical cell or stack.

5. The system of claim 4, further comprising a second volume of liquid water in fluid communication with the cathode side of the first electrochemical cell or stack and the cathode side of the second electrochemical cell or stack.

6. The system of claim 1, wherein the first and second electrochemical cells or cell stacks are configured to produce hydrogen at a pressure of from greater than 0 psi to 12,000 psi.

7. The system of claim 1, further comprising a compressor having an inlet in fluid communication with the outlets of the first and second electrochemical cells or cell stacks.

8. The system of claim 1, wherein the hydrogen output of the first electrochemical cell or cell stack is represented by gas pressure from the outlet of the first electrochemical cell or cell stack, and the second electrochemical cell or cell stack is controllably operated in response to said gas pressure.

9. The system of claim 8, further comprising a pressure switch or sensor in a hydrogen stream downstream of the first and second electrochemical cell or cell stack outlets and a pressure regulator downstream of the pressure switch or sensor.

10. The system of claim 1, further comprising one or more additional first electrochemical cells or cell stacks having an inlet in controllable fluid communication with a variably-available source of the first gas in fluid communication with an anode side of said one or more additional first electrochemical cells or cell stacks, and an outlet in fluid communication with a cathode side of said one or more first additional electrochemical cells or cell stacks.

11. The system of claim 1, further comprising one or more additional second electrochemical cells or cell stacks having a water inlet in fluid communication with said one or more additional second electrochemical cells or cell stacks, and an outlet in fluid communication with a cathode side of said one or more second additional electrochemical cells or cell stacks.

12. The system of any of claims 1-11, wherein the first gas further comprises at least one gas component other than hydrogen.

13. A method of providing hydrogen, comprising
receiving a hydrogen demand signal;
when the hydrogen demand signal is greater than zero and a first gas comprising hydrogen is available, operating a first electrochemical cell or cell stack comprising a first membrane electrode assembly comprising a cathode and an anode separated by a proton exchange membrane, and an inlet for the first gas in fluid communication with the anode side of the first electrochemical cell or cell stack, to provide hydrogen at an outlet in fluid communication with the cathode side of the first membrane electrode assembly, and controllably operating a second electrochemical cell or cell stack comprising a second membrane electrode assembly comprising a cathode and an anode separated by a proton exchange membrane, and a water inlet in fluid communication with the second membrane electrode assembly, in response to the hydrogen demand signal and/or the hydrogen output of the first electrochemical cell or cell stack to provide hydrogen at an outlet in fluid communication with the cathode side of the second membrane electrode assembly; and when the hydrogen demand signal is greater than zero and the first gas is not available at the first electrochemical cell or cell stack inlet, operating the second electrochemical cell or cell stack to provide hydrogen at the outlet in fluid communication with the cathode side of the second membrane electrode assembly.

14. The method of claim 13, wherein the controller operates the first electrochemical cell or cell stack at a predetermined current when the first gas is available, and to selectively toggle the second electrochemical cell or cell stack between an off state and an on state in response to the hydrogen demand signal and/or the hydrogen output of the first electrochemical cell or cell stack.

15. The method of claim 13, wherein the controller operates the first electrochemical cell or cell stack at a predetermined current when the first gas is available, and to operate the second electrochemical cell or cell stack at a variable current in response to the hydrogen demand signal and/or the hydrogen output of the first electrochemical cell or cell stack.

16. The method of claim 13, wherein the water inlet of the second electrochemical cell or cell stack is in fluid communication with the anode side of the second membrane electrode assembly, and a first volume of liquid water is in fluid communication with the water inlet of the second electrochemical cell or cell stack and in fluid communication with the anode side of the first electrochemical cell or cell stack proton exchange membrane.

17. The method of claim 16, wherein a second volume of liquid water is in fluid communication with the cathode side of the first electrochemical cell or cell stack proton exchange membrane and the cathode side of the second electrochemical cell or cell stack proton exchange membrane.

18. The method of claim 13, wherein the first and second electrochemical cells or cell stacks are operated to produce hydrogen at a pressure of from greater than 0 psi to 12,000 psi.

19. The method of claim 13, further comprising compressing hydrogen from the outlets of the first and second electrochemical cells or cell stacks.

20. The method of claim 13, further comprising determining the hydrogen output of the first electrochemical cell or cell stack from gas pressure from the outlet of the first electrochemical cell or cell stack, and wherein the second electrochemical cell or cell stack is controllably operated in response to said gas pressure.

21. The method of claim 13, further comprising operating one or more additional first electrochemical cells or cell stacks having an inlet for the first gas in fluid communication with an anode side of said one or more additional first electrochemical cells or cell stacks, and an outlet in fluid communication with a cathode side of said one or more first additional electrochemical cells or cell stacks.

22. The method of claim 13, further comprising operating one or more additional second electrochemical cells or cell stacks having a water inlet in fluid communication with said one or more additional second electrochemical cells or cell stacks, and an outlet in fluid communication with a cathode side of said one or more second additional electrochemical cells or cell stacks.

23. A system for providing hydrogen, comprising:
a first electrochemical cell or cell stack comprising a first membrane electrode assembly comprising a cathode and an anode separated by a proton exchange membrane, an inlet in controllable fluid communication with a variably-available source of a first gas that comprises hydrogen in fluid communication with the anode side of the first electrochemical cell or cell stack, and an outlet in fluid communication with the cathode side of the first membrane electrode assembly;
a second electrochemical cell or cell stack comprising a second membrane electrode assembly comprising a cathode and an anode separated by a proton exchange membrane, a water inlet in fluid communication with the anode side of the second membrane electrode assembly, and an outlet in fluid communication with the cathode side of the second membrane electrode assembly; and
a first volume of liquid water in fluid communication with the water inlet of the second electrochemical cell or cell stack and in fluid communication with the anode side of the first electrochemical cell or cell stack proton exchange membrane, or a second volume of liquid water in fluid communication with the cathode side of the first membrane electrode assembly and the cathode side of the second electrochemical membrane electrode assembly.

24. The system of claim 23, comprising said first volume of liquid water.

25. The system of claim 23, comprising said second volume of liquid water.

26. The system of claim 23, comprising said first volume of liquid water and said second volume of liquid water.

* * * * *